United States Patent
Jun et al.

(10) Patent No.: US 7,362,950 B2
(45) Date of Patent: Apr. 22, 2008

(54) METHOD AND APPARATUS FOR CONTROLLING REPRODUCTION OF VIDEO CONTENTS

(75) Inventors: Sung Bae Jun, Seoul (KR); Kyoung Ro Yoon, Seoul (KR); Bae Guen Kang, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1626 days.

(21) Appl. No.: 10/151,100

(22) Filed: May 21, 2002

(65) Prior Publication Data

US 2002/0178453 A1 Nov. 28, 2002

(30) Foreign Application Priority Data

May 22, 2001 (KR) .............................. 2001-28094

(51) Int. Cl.
*H04N 7/26* (2006.01)
(52) U.S. Cl. .......................................... 386/68; 46/124
(58) Field of Classification Search .................. 386/46, 386/52, 64, 69, 70, 95, 111, 112, 126; 345/328; 348/699, 700

See application file for complete search history.

(56) References Cited

U.S. PATENT DOCUMENTS 6,192,183 B1 * 2/2001 Taniguchi et al. ............ 386/52
6,721,490 B1 * 4/2004 Yao et al. ..................... 386/69

FOREIGN PATENT DOCUMENTS

JP 9-098382 4/1997
WO WO00/45600 8/2000

* cited by examiner

*Primary Examiner*—Thai Q. Tran
*Assistant Examiner*—Mishawn Dunn
(74) *Attorney, Agent, or Firm*—Ked & Associates, LLP (57) ABSTRACT

A method and apparatus for controlling reproduction of video contents, wherein a user can readily move a play position to a desired scene within a brief period of time to reproduce video contents from the moved play position. The user can pause or replay a desired scene without requesting separate skipping. In particular, in the case where the user requests a pause mode or a normal play mode during a quick browsing mode, rather than during the normal play mode, the present system exhibits many differences from existing systems and excellent performance over them.

20 Claims, 4 Drawing Sheets

Fig. 1

(Related Art)

Fig. 2

(Related Art)

Fig. 5 actually desired position and system
input request time offset
between positions

|←————————————————→| forward play → desired position | recognized position | position where pause or normal play is requested position where pause normal play is requested | recognized position | desired position ← reverse play actually desired position and system
input request time offset
between positions

Fig. 6 time offset between desired position and actual replay in consideration of average user response time The time offset between actually desired position and system input request average user response time actual replay position | desired position | recognized position | position where pause or normal play is requested

METHOD AND APPARATUS FOR CONTROLLING REPRODUCTION OF VIDEO CONTENTS

BACKGROUND OF THE INVENTION

1. Field of the Invention

The present invention relates to a multimedia data browsing system, and more particularly to a method and apparatus for controlling reproduction of video contents to allow a user to readily move a play position to a desired scene within a brief period of time and reproduce video contents from the moved play position.

2. Description of the Related Art

With the advance of mass media and the simplified creation processes of multimedia contents, ordinary persons have accessed copious media information.

As volume of multimedia contents is increased, there has been a need for an automation system to sort out data desired by users, and researches are in active progress for schemes to meet such a need.

With the development of digital technologies, video contents are on a trend of being digitally stored and distributed. The popularization of digital broadcasting will accelerate the digitalization of such media.

A high speed browsing technique for a part of such video contents desired by a user enables sorting and reproduction of a user-desired part of the video contents.

For example, one user may desire to view only a sports associated part of news video contents and another user may desire to view only a stock market associated part of the news video contents.

Yet another user may desire to view only a specific scene of a sports program or show program where a specific character appears.

A variety of studies are in active progress to meet such various desires of users.

Owing to results of such studies, users can search/filter and browse only a desired part of desired video contents at a desired time.

The most basic techniques for a nonlinear video browsing and search are shot segmentation and shot clustering, both of which are the kernel in analyzing video contents.

In this regard, up to now, many studies have been concentrated on the shot segmentation technique and research results in the shot clustering technique have been continuously published.

It can be seen from various studies that the shot segmentation can be automated and most algorithms associated therewith can be implemented with a high accuracy of up to 90% or more.

Also, the shot clustering technique can be automated with a high level of accuracy by applying it suitably to a program genre on the basis of a detected characteristic event or general characteristics of the shot.

In general terms, video contents are logically divided into several story units.

These story units are typically referred to as scenes or events.

For example, a gunfight scene, conversation scene, etc. may correspond to the story unit.

These scenes are composed of a connection of several sub-scenes or shots.

A shot is a sequence of video frames acquired from one camera without interruption, which is the most basic unit for video analysis or construction.

The shot segmentation signifies a technique for dividing video contents into individual shots, and the shot clustering signifies a process of reconstructing the individual shots into a logical scene unit on the basis of their characteristics to detect a logical story structure of the video contents.

Figure 1:
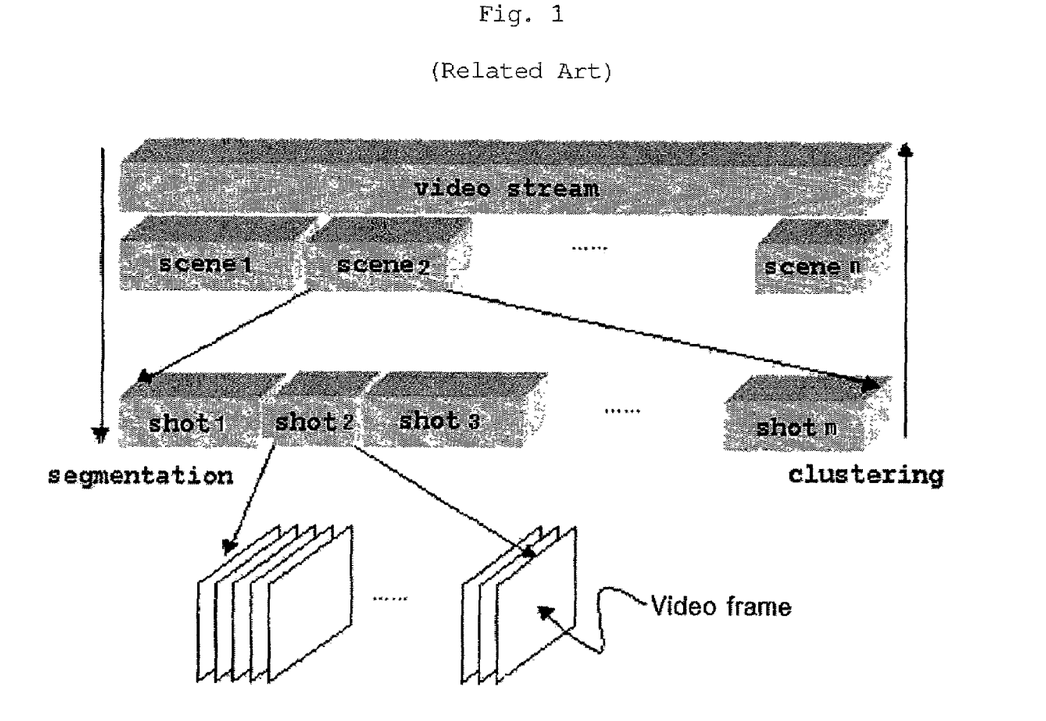
FIG. 1 is a view illustrating the concepts of shot segmentation and shot clustering.

FIG. 1 illustrates the shot segmentation and shot clustering processes.

Generally, most shot segmentation algorithms are based on such a characteristic that image/motion/audio similarities are present in the same shot and image/motion/audio non-similarities are measured between two different shots, and most shot clustering algorithms are based on such a characteristic that shots with similar characteristics are detected again within a certain period of time.

Various video indexing techniques have recently been studied for the purpose of finding a desired scene in a digital video.

For example, a research has been done for developing an interface capable of detecting shots as physical edit units and scenes as logical semantic units of a video stream, summarizing the entire contents of the video stream on the basis of key frames representative of the detected units and allowing a user to select a desired one of the key frames so as to select a desired play position.

This interface is utilized as a tool for enabling a user to move a play position to a desired position in a one-step manner.

Figure 2:
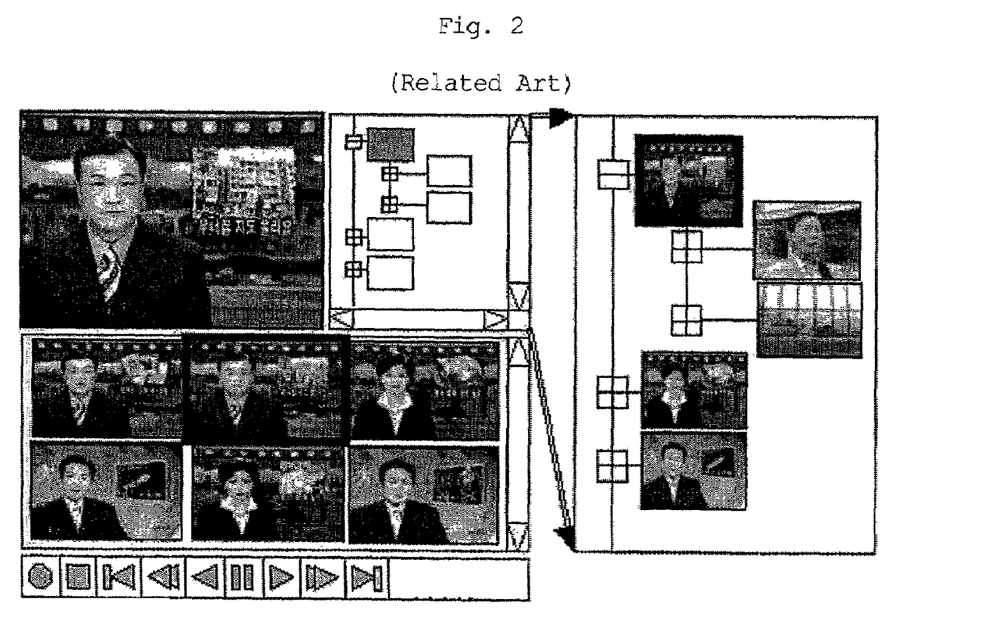
FIG. 2 is a view showing an example of a key frame-based video browsing interface.

FIG. 2 shows an example of a key frame-based video browsing interface.

Through the use of the interface shown in FIG. 2, a user can move a play position to a desired position in a one-step manner by selecting a desired key frame.

In a key frame-based video navigation, however, it is very important to control the number of key frames.

In other words, the provision of too many key frames necessitates a large number of inputs from a user during video navigation, and the provision of too few key frames makes it difficult to move a play position to a position actually desired by the user in a one-step manner.

Moreover, because this type of interface requires the user's frequent inputs, the user cannot easily access the interface if he/she uses a simple input unit environment such as a TV environment rather than a computer environment, or a terminal with a limited screen size, such as a PDA.

Unlikely from an analog video, a digital video can be prevented from deterioration in its picture quality in fast forward/fast rewind modes.

A method generally used for high-speed video reproduction is a frame rate increasing method for increasing the number of frames to be decoded per unit time and partly displaying only some of the resulting frames, or a frame skipping method for decoding frames while skipping over a certain portion thereof, and displaying the resulting frames.

However, the frame rate increasing method has a disadvantage in that the maximum frame rate is influenced by performance of a terminal device and a bit rate of the original stream. In this connection, the frame skipping method is generally used in fast forward/fast rewind modes of a digital video.

The fast forward/fast rewind functions of the frame skipping method are disadvantageous in that a still image is displayed for a lengthy period of time or similar scenes are repetitively reproduced because they do not utilize structural information of video contents.

While watching a video or TV, a user may often desire to skip over specific video contents or unconcerned video contents such as advertisements.

In order to meet such desires, a time offset-based forward or reverse skipping method has been proposed by Tivo or ReplayTV.

Using this skipping method, the user can move a play position to a desired segment by skipping over an undesired segment.

However, a forward/reverse skipping method implemented in an existing set-top box does not consider semantic/structural information of video contents. For this reason, a user may be required to provide several inputs in order to move a play position to a desired position. Furthermore, it is actually difficult to move the play position to the desired position.

SUMMARY OF THE INVENTION

Therefore, the present invention is directed to an intelligent method and apparatus for reproducing video contents that substantially obviates one or more problems due to limitations and disadvantages of the related art.

It is an object of the present invention to provide a method and apparatus for controlling reproduction of video contents, wherein a replay position or pause position of the video contents actually desired by a user is accurately and rapidly selected so that the video contents can be reproduced from the selected position or paused at the selected position, thereby minimizing the number of requests for the user's re-input for movement to an accurate position.

In accordance with the present invention, the above and other objects can be accomplished by the provision of a method and apparatus for controlling reproduction of video contents, wherein a replay or pause position of the video contents is selected in consideration of structural/semantic index information of the video contents as well as a time offset.

In one embodiment of the present invention, if a user requests the system, through user interface means, to pause video contents or play them from a current position during a normal play mode or a high speed browsing mode such as a skimming, a new replay position or pause position of the video contents is selected in consideration of a play direction and play speed (including a changed speed for browsing in a broad meaning) of a video stream, structural/semantic information by segments of the video contents, and a user response time (a time offset from the user's pause or play request to the actual input of the request to the system, an average user response time or a minimum user response time). Therefore, the number of requests for the user's re-input for movement to an accurate position can be minimized.

BRIEF DESCRIPTION OF THE DRAWINGS

The above and other objects, features and other advantages of the present invention will be more clearly understood from the following detailed description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings, in which:

DESCRIPTION OF THE PREFERRED EMBODIMENTS

The following detailed description of the embodiments of the invention is not intended to limit the scope of the invention, as claimed, but is merely representative of the presently preferred embodiments of the invention. In the description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

As previously stated, a frame skipping method can be used in a digital video technique to skip over digital video contents at regular frame intervals in a fast-forward (FF) or fast rewind (FR) mode. However, this simple frame skipping method has a disadvantage in that it does not utilize structural information of video contents, thereby causing a still image to be displayed for a lengthy period of time, or similar scenes to be repetitively displayed.

One approach to the above problem with the frame skipping method may be considered to be a video skimming system using structural information of video contents.

Figure 3:
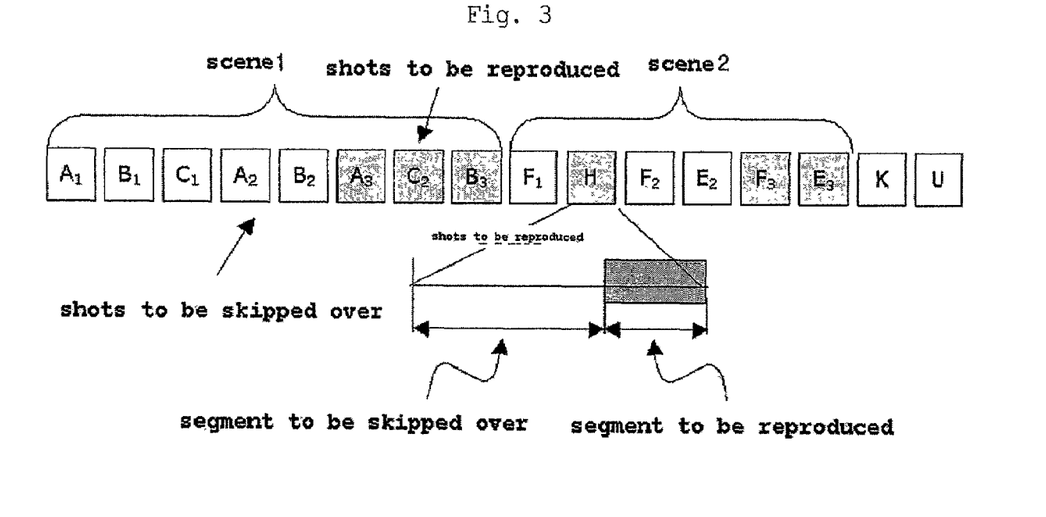
FIG. 3 is a view illustrating a video skimming method using structural information of video contents.

FIG. 3 briefly illustrates a video skimming method using structural information of video contents.

The structural information-based video skimming method is adapted to select shots to be skipped over and shots to be reproduced from among shots in each scene or story unit in consideration of an arrangement of the shots and characteristics thereof, and then reproduce only a part of the shots to be reproduced. As a result, this video skimming method provides a quick video navigation function to a user by reproducing video contents without duplication while letting the user understand the entire contents.

In the video skimming method using structural information of video contents, as shown in FIG. 3, shots A3, C2, B3, H, F3 and E3 to be reproduced and shots A1, B1, C1, A2, B2, F1, E2, F2, K and U to be skipped over are selected from respective logical story units or scenes and only a part (segment) of each shot to be reproduced is then displayed, thereby enabling the user to understand most of the video contents without watching the entire contents.

On the other hand, as described previously, a skipping method has been proposed in which a user can move a play position to a desired segment by skipping over an undesired segment.

However, this skipping method does not consider semantic/structural information of video contents, either. For this reason, a user may be required to provide several inputs in order to move a play position to a desired position, and it is actually difficult to move the play position to the desired position.

One approach to the above problem with the skipping method may be considered to be a forward/reverse skipping method using structural/semantic information of multimedia contents.

The forward/reverse skipping method using structural/semantic information of multimedia contents is adapted to, if a user requests a forward or reverse skipping function, set change positions for the structural/semantic information of the multimedia contents as candidates for a replay position and then select as the replay position a structural/semantic information change position most approximate to the user's request from among the candidates.

As compared with a forward/reverse skipping method based on only time, the above method has the advantage of reducing the number of requests for the user's input and accurately moving a play position to a desired position.

Figure 4:
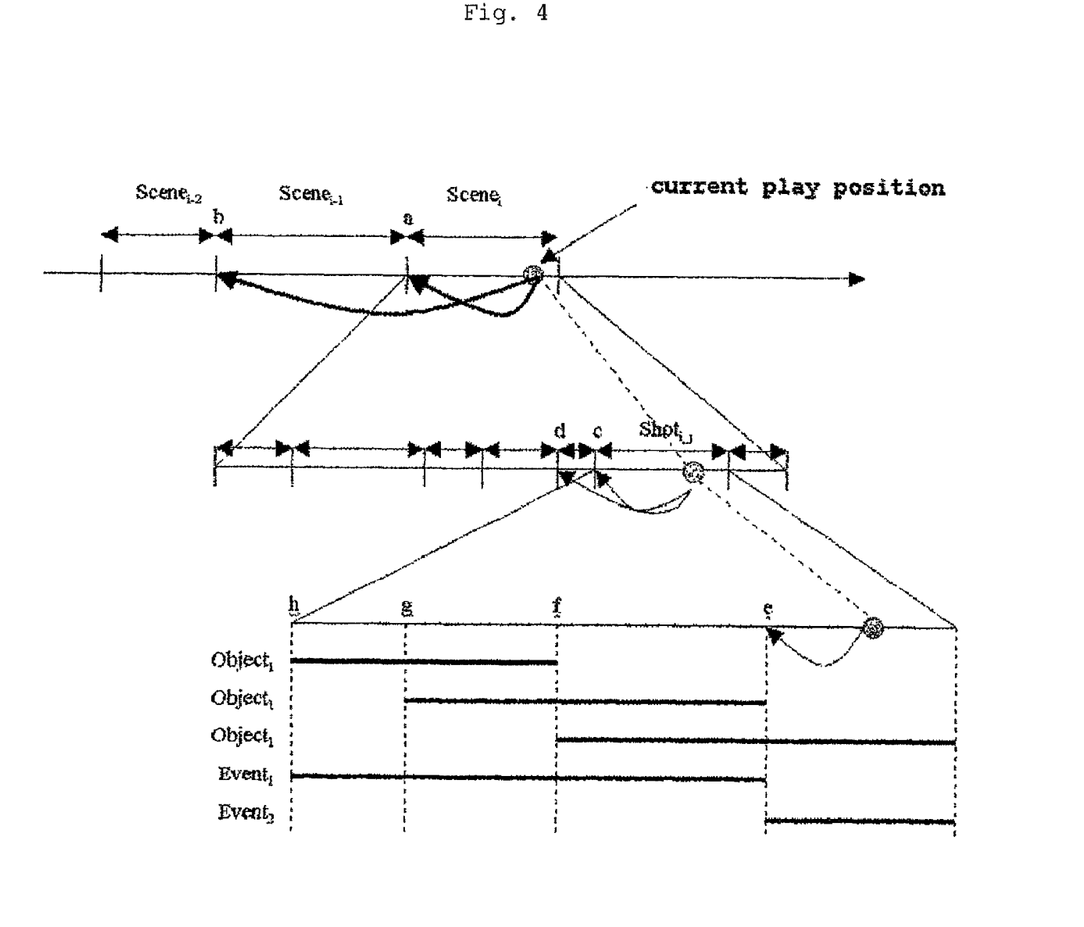
FIG. 4 is a view illustrating a reverse skipping function using both structural information and semantic information of video contents.

FIG. 4 illustrates a forward/reverse skipping method using structural/semantic information of video contents.

If a user requests a skipping function, a structural/semantic information change position (an appropriate one of positions a, b, c, d, e, f, g and h considering appearance and disappearance of scenes, shots and objects) most approximate to the user's request is selected from among structural/semantic information change positions before or after a current position, and a play position of a video stream is then changed to the selected structural/semantic information change position.

Either the video skimming method considering structural information of video contents or the reverse or forward skipping method using both structural/semantic information of video contents, as described above, can be utilized as a fundamental element for video reproduction control.

According to the present invention, in the case where a user requests the system to perform a normal play mode during a quick play mode or a pause mode during the quick play mode or normal play mode, video contents can be paused at a position actually desired by the user or reproduced therefrom in consideration of structural/semantic information of the video contents.

In addition, a time difference from the user's normal play mode or pause mode request to the actual input of the request to the system, namely, a response time offset, can be taken into consideration.

The user may request a quick browsing function to browse only desired video contents portions while skipping over unconcerned video contents portions.

Under the condition that the quick browsing function requested by the user is performed, he/she will request the quick play mode to reproduce video contents from a desired position, and then request the normal play mode or pause mode when the current play position reaches the desired position in the quick play mode.

That is, upon recognizing with the naked eye that the current play position has reached the desired position in the quick play mode, the user will input a play or pause command through the use of interface means, such as a mouse or keyboard, to request the system to reproduce video contents from the desired position or pause them at the desired position.

In analog environments, a method is used which replays or pauses video contents at the moment that the user requests the normal play mode or pause mode during the quick browsing mode.

However, in the case where the quick play mode desired by the user is performed, images are very quickly changed, resulting in a time difference existing between a point of time that the user recognizes a desired portion and a point of time that the user requests the pause mode or normal play mode. This time difference will be defined as a user response time.

Figure 5:
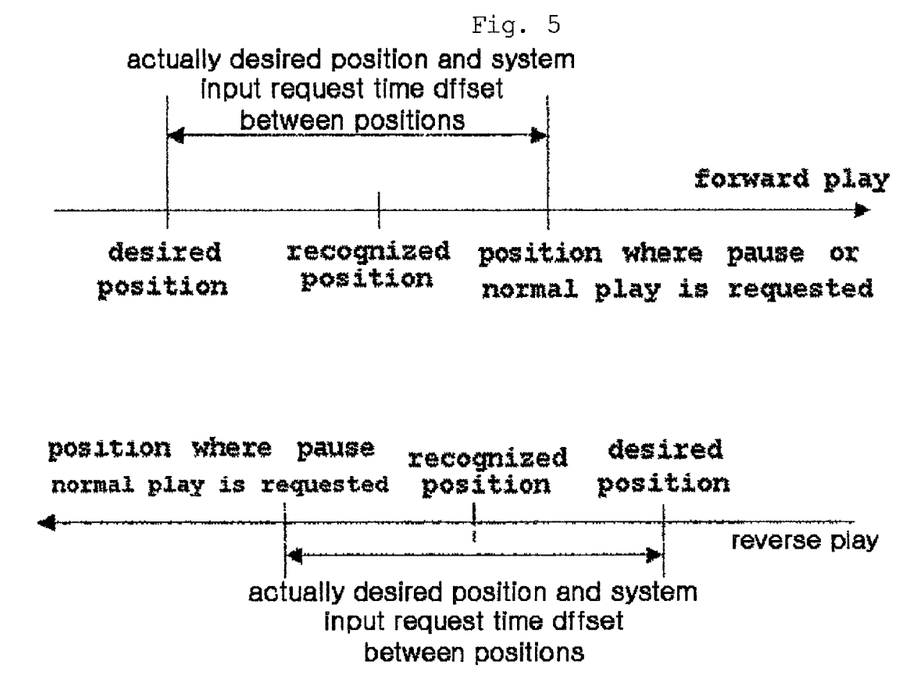
FIG. 5 is a view illustrating a time offset based on a user response time.

FIG. 5 illustrates a difference between a normal replay or pause position desired by the user and an actual replay or pause position due to a user response time.

In digital environments, it is possible to randomly access media. In this regard, a method can be provided which predicts a portion actually desired by the user in consideration of a time offset and an average user response time, and then replays a video stream from the predicted portion or pauses it at the predicted portion.

Figure 6:
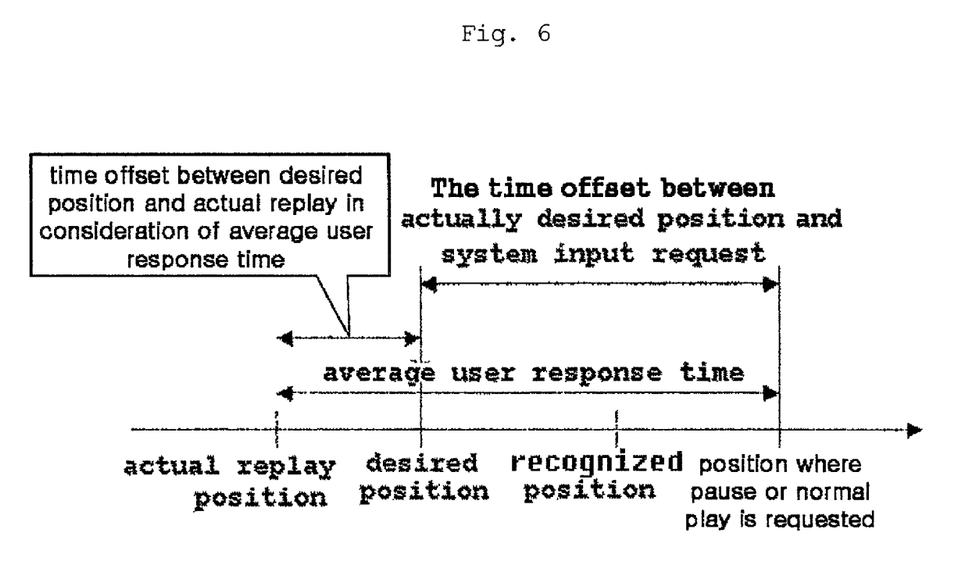
FIG. 6 is a view illustrating an example of a method for selecting a replay position based on an average user response time.

FIG. 6 illustrates a method for estimating a normal replay or pause position actually desired by the user in consideration of an average user response time and then pausing video contents at the estimated position similar to the normal replay or pause position actually desired by the user or replaying the video contents from the estimated position.

In this method, however, in most cases, a time difference is still present between a point of time that the user requests the replay mode or pause mode and a point of time that the replay mode or pause mode is actually performed. As a result, the user can move the play position to the desired position by further using the forward or reverse skipping function.

This situation can also occur similarly in the case where the user requests the pause mode while playing media at normal speed.

As described above, in the case where the user requests the pause mode during the normal play mode or the normal play mode or pause mode during the quick browsing mode to play media from a desired portion, a delay time exists from a point of time that the user recognizes a desired scene and requests the pause mode or normal play mode to a point of time that the system responds to the user's request.

Thus, in the case where only a simple time offset is considered to perform the pause mode at a position desired by the user or the normal play mode from the desired position on the basis of the above-mentioned delay time, forward/reverse skipping must be additionally performed.

Therefore, the present invention provides a system for reducing the number of the user's additional forward/reverse skipping requests by resuming the play mode or performing the pause mode at a structural/semantic information change position most approximate to a time offset on the basis of semantic/structural index information of video contents.

In other words, the present invention provides a method and apparatus for controlling reproduction of video contents, wherein, if the user requests the normal replay mode or pause mode during the quick browsing mode or the pause mode during the normal play mode, the pause mode or normal replay mode is performed at a position closest to the user's request in consideration of a delay time from the moment that a portion actually desired by the user is displayed to the moment that the user recognizes the display of the desired portion and applies a pause command or normal play command to the system.

In particular, the video contents reproduction control method and apparatus according to the present invention utilize as the input to the pause or replay position selection structural/semantic index information of video contents, as well as a simple time offset.

The following elements can be used for selection of a replay or pause position according to the present invention:
1. Play direction of media (forward/reverse)
2. Play speed of media
3. Average user response time based on media play speed (general or user-dependent)
4. Minimum user response time (general or user-dependent)
5. User's input (pause or normal replay)
6. Semantic/structural index information of video contents In the case where the user requests the pause mode or normal replay mode during the normal play mode or quick browsing mode, the system responds in the below order in consideration of the above elements:

Step 1: the system calculates a time offset (D:D>0) estimated from a current position C in consideration of a current play speed of media and an average user response time based on the media play speed.

Step 2: the system sets a value (C−D) of the current position minus D as a primary replay or pause candidate position R' if the play direction of the media is forward, and sets a value (C+D) of the current position plus D as the primary replay or pause candidate position R' if the play direction of the media is reverse.

Step 3: the system selects any one of structural/semantic information change positions close to the primary replay or pause candidate position R' obtained at the second step as an actual replay or pause position R, and then stops a picture at the selected position R or replays it from the position R at normal speed.

At this time, the system selects the most appropriate actual replay or pause position by using together the current position C at a point of time that it receives the user's input, the primary candidate position R', the play speed, the play direction, the minimum user response time and the semantic/structural index information of the video contents.

The video contents reproduction control method of the present invention as stated above will hereinafter be described in more detail.

[Step 1]: the system calculates a time offset (D:D>0) estimated from a current position C in consideration of a current play speed of media and an average user response time based on the media play speed.

Here, the current play speed of the media is a relative speed which is a multiple of the normal play speed and is expressible in numerical values.

Namely, if the current play speed is an x1 speed, it will be the normal play speed. Also, if the current play speed is an x2 speed or more, it will correspond to a fast forward browsing mode or a fast rewind browsing mode.

The average user response time may be a general average user response time based on a play speed preset in the system, or a user-dependent response time.

Information regarding the user-dependent response time may be stored in a nonvolatile memory of the system or in a portable personal information storage unit such as a smart card.

The system may utilize automatically measured user-dependent average response time information through a learning process. Alternatively, the user may personally input his/her own average response time.

As a result, the calculation of the offset D at the first step can be expressed as follows:

D=F (play speed, average user response time based on play speed)

This offset D may be defined in a table or as a linear or nonlinear function.

In general terms, the higher the play speed, the greater the result of the first step, the offset D.

Further, a scene change speed can be applied to the selection of the primary candidate position at the first step.

Video contents include both fast changed scenes and slowly changed scenes. The scene change speed can be automatically measured from an interframe image difference or motion vector information.

The scene change speed is in proportion to an interframe image difference and a motion vector amount.

As a result, the primary candidate position can be obtained in the following manner.

D=F (play speed, average user response time based on play speed), or

D=F (play speed, average user response time based on play speed, scene change speed and average user response time based on scene change speed)

A method for determining the above-stated play speed-based average user response time will hereinafter be described briefly.

The average user response time can be calculated by a linear function with respect to the play speed of the media or the scene change speed of the video contents, or by a nonlinear function.

Namely, the average user response time can be calculated in proportion to the play speed if it is based on the play speed, or the scene change speed if it is based on the scene change speed.

Alternatively, the average user response time may be designated by a value prestored in a table with respect to the media play speed or the contents scene change speed.

Or, the average user response time may be a general average user response time preset in the system, or be personally edited by the user at his/her discretion.

Or, the average user response time may be user-dependent data differently set by each user, and information regarding the user-dependent response time may be stored in a nonvolatile memory of the system or in a portable storage unit such as a smart card.

[Step 2]: the system sets a value (C−D) of the current position minus D as a primary replay or pause candidate position R' if the play direction of the media is forward, and sets a value (C+D) of the current position plus D as the primary replay or pause candidate position R' if the play direction of the media is reverse.

The second step is carried out to select a replay or pause candidate position.

At this step, the system selects the primary replay or pause candidate position R' by subtracting or adding the time offset D calculated at the first step from or to the current position C in consideration of the media play direction in response to the user's pause or normal play mode request.

Here, the media play direction is forward or reverse. If the media play direction is forward, the system sets as the primary candidate position a value obtained by subtracting the offset D based on the average user response time from the media play position at a point of time that it receives the user's input. In the case where the media play direction is reverse, the system sets as the primary candidate position a value obtained by adding the offset D based on the average user response time to the media play position.

[Step 3]: the system selects an actual replay or pause position.

After the primary candidate position based on the time offset is selected at the second step, the system selects several structural/semantic information change positions close to the selected primary candidate position as secondary candidate positions and then selects a position with the highest probability from among the secondary candidate positions as the actual replay or pause position R on the basis of various criteria.

The structural information of the video contents preferably includes a logical story unit, or scene information, and a physical edit unit, or shot information, together with time description information, or a start position and duration or the start position and an end position.

The semantic information of the video contents preferably includes information regarding appearance/disappearance of an object, information regarding occurrence/end of an event, information regarding an object state, and background information, described with time information.

Positions where the above-stated structural/semantic information are changed are selected as candidates for the actual replay (or pause) position, and the actual replay (or pause) position is then selected from among the candidates by applying various criteria to the candidates.

The system selects the actual replay or pause position on the basis of the current position C at a point of time that it receives the user's input, the primary candidate position R', the play speed, the play direction, the minimum user response time and the semantic/structural index information of the video contents, as will be summarized as follows:

R=F (C, R', play speed, play direction, minimum user response time, semantic/structural index information of video contents)

R<C if the play direction is forward and R>C if the play direction is reverse.

In some cases, R'>R, R'=R or R'<R.

The minimum user response time is used to satisfy the following conditions:

R>C+offset corresponding to minimum response time (reverse), or

R<C−offset corresponding to minimum response time (forward)

Here, the minimum user response time is a minimum time required for a person to physically recognize a given situation and apply a command in response thereto. This minimum user response time may be set to a general value or to a different value by each user, and be edited by the user at his/her discretion. Information regarding the minimum user response time may be stored in a nonvolatile memory of the system or in a portable nonvolatile storage unit independent of the system, such as a smart card.

When positions where the structural/semantic information of the video contents are changed are selected as candidates for the actual replay (or pause) position in consideration of the minimum user response time, the structural/semantic information change positions existing within the minimum user response time are excluded from the candidates.

In other words, because the minimum user response time is a minimum time required for a person to physically recognize a given situation and apply a command in response thereto, the structural/semantic information change positions coming within the minimum user response time cannot be regarded as those recognized (desired) by the user.

After the browsing range for the actual replay (or pause) position R becomes narrower as described above, the actual replay (or pause) position R is obtained from among several candidate positions.

The actual replay (or pause) position R can be obtained according to the following rules:

Rule 1: a semantic/structural information change position closer to the primary candidate position R' has a higher probability to be selected as R.

Rule 2: a larger unit-semantic/structural information change position has a higher probability to be selected as R.

For example, a background or place change, or a change of a scene, or a story unit, not an edit unit, has a higher probability to be selected as R.

That is, a position with the highest marks is extracted from among several candidate positions {R1, R2, R3, ..., Rk} on the basis of a weighted function of the distance from each candidate position to the primary candidate position R' and information change attributes of each candidate position, and then selected as the actual replay (or pause) position R.

Considering the above rules, a structural/semantic information change position closest to the primary candidate position R' is extracted from among structural/semantic information change positions within a certain browsing range from the primary candidate position R' on the basis of a time offset from the primary candidate position R', and then selected as the actual replay (or pause) position R, or the actual replay (or pause) position R is selected from among the structural/semantic information change positions on the basis of a weighted function of the time offset and a scene change level.

At this time, a semantic/structural information change position closer to the primary candidate position R' has a higher probability to be selected as R. Also, a scene change has a higher probability to be selected as R than a shot change. Moreover, a larger unit-scene change such as a background change has a higher probability to be selected as R than a smaller unit-scene change such as appearance/disappearance of an object.

On the other hand, in some cases, the second condition (rule 2) may be omitted when index information including no description of semantic/structural information change position attributes is used. Also, structural information is not used in the case where only semantic information is indexed, and semantic information is not used in the case where only structural information is indexed.

Figure 7:
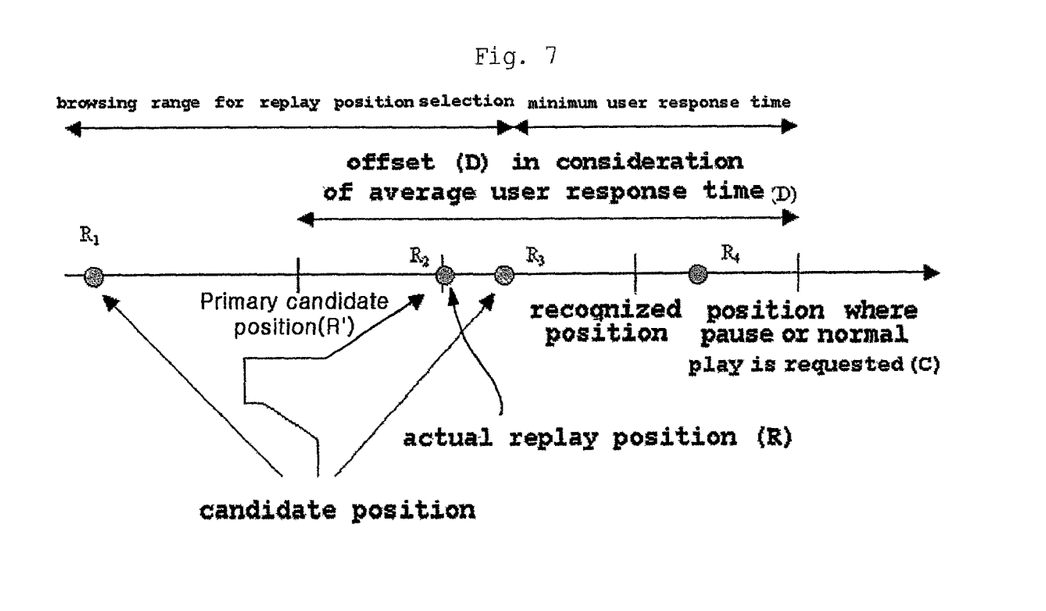
FIG. 7 is a view illustrating a preferred embodiment of the method for selecting a pause or replay position in accordance with the present invention.

FIG. 7 illustrates a preferred embodiment of a replay or pause position selection method in accordance with the present invention, wherein the play direction is forward.

A user recognizes a need to perform a pause or replay operation at a specific position during a normal play mode or quick browsing mode, and then inputs a pause or normal replay mode request to the system in response to the recognition (current position C).

Upon receiving the pause or normal replay mode request from the user, the system obtains a time offset D on the basis of the play direction, a play speed and an average user response time, and then selects a primary candidate position R' on the basis of the obtained time offset D.

After the primary candidate position R' is selected, the system sets a browsing range (for replay position (or pause position) selection) in consideration of a minimum user response time, and then selects structural/semantic information change positions R1, R2, R3 and R4 within the browsing range as candidate positions for an actual replay (or pause) position R, as stated previously.

Thereafter, the system extracts the actual replay or pause position R (R=R2 in FIG. 7) from among the candidate positions R1, R2, R3 and R4 on the basis of the time offset from the primary candidate position R' and structural/semantic information change position attributes, and then performs the replay mode or pause mode at the extracted position R.

The selected actual replay position R must satisfy the conditions: R<C if the play direction is forward; and R>C if the play direction is reverse.

Figure 8:
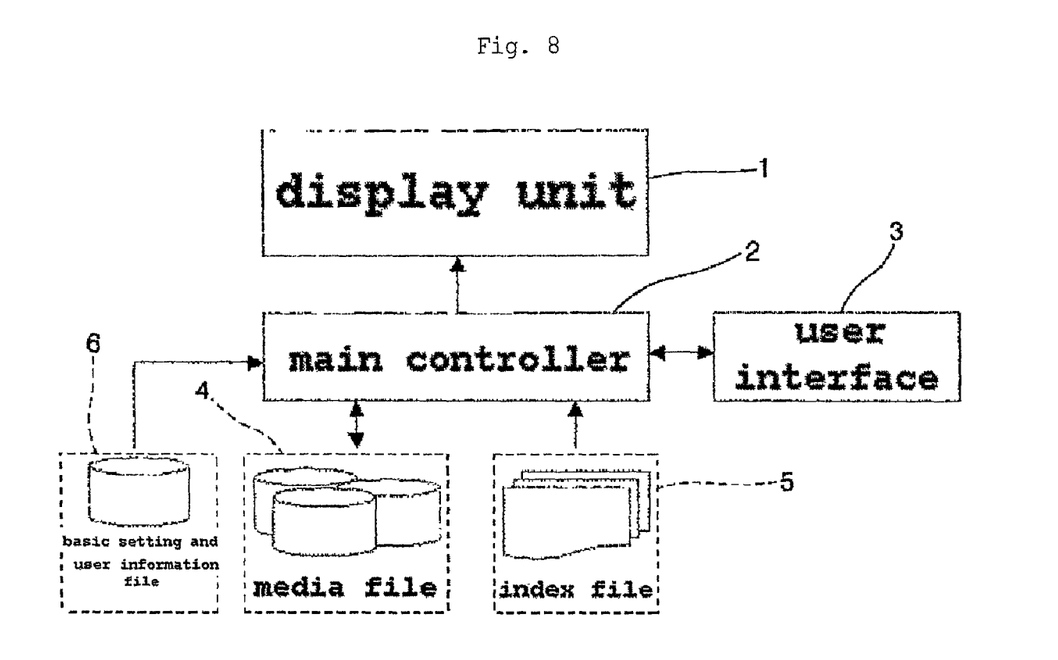
FIG. 8 is a block diagram showing a preferred embodiment of a system for controlling reproduction of video contents in accordance with the present invention.

FIG. 8 is a block diagram showing a preferred embodiment of a video contents reproduction control system in accordance with the present invention, wherein a replay position or pause position is selected on the basis of both a user response time and scene change index information of video contents in response to a user's pause mode or normal replay mode request during video play.

The system comprises a display unit 1, a main controller 2, a user interface 3, a media file 4, an index file 5, and a basic setting and user information file 6.

In some cases, the index file may be included in the media file, and user-dependent information may not be used.

The display unit 1 is output means including a monitor for displaying a video stream and a speaker, and the user interface 3 is input means including a keyboard, a mouse, a remote controller and buttons for receiving the user's input.

The media file 4 stores video (audio) data, and the index file 5 stores semantic/structural index information associated with shot/scene information of video contents, appearance/disappearance of characters or objects, a background change, etc.

The user can request the system through the user interface 3 to perform a normal replay mode or pause mode during video play.

In response to the user's request, the main controller 2 selects an actual replay or pause position on the basis of a current play position at a point of time that it receives video contents from the media file 4, a previous play mode (play speed and play direction), an average user response time, a minimum user response time and semantic/structural index information of the video contents, and then replays the video contents from the selected position or pauses them at the selected position.

The information regarding the average user response time or minimum user response time is loaded from the basic setting and user information file 6.

The main controller 2 always stores information regarding a current play position and information regarding a play mode prior to the user's request in a memory during video play, and loads semantic/structural index information of video contents into the memory as needed.

The basic setting and user information file 6 may be stored in a nonvolatile memory of the system or in a portable nonvolatile storage unit independent of the system, such as a smart card.

As apparent from the above description, the present invention provides a method and system for selecting a replay position or pause position on the basis of both a user response time and scene change index information of video contents in response to a user's pause mode or normal replay mode request during video play in a digital video environment.

According to the present invention, a time difference is offset between an actual user input time and an actual replay or pause position, and semantic/structural index information of video contents are used to minimize the number of the user's additional forward/reverse skipping requests to reproduce from the beginning a video portion in which the user has an interest.

Further, as compared with a conventional method using a simple time offset, the present method is capable of minimizing the number of the user's additional inputs and performing a replay mode or pause mode at a more accurate position.

As described above, using the normal replay or pause position selection method of the present invention, the user can pause or replay a desired scene without requesting separate skipping.

In particular, in the case where the user requests the pause mode or a normal play mode during a quick browsing mode, rather than during the normal play mode, the present system exhibits many differences from existing systems and excellent performance over them.

Furthermore, the present invention is basically applicable to media subject to recording and indexing at the same time and a time-shift set-top box performing recording and reproduction at the same time. The present invention is also applicable to a VOD client/server environment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling reproduction of video contents, comprising the steps of:
  a) receiving a user request for pause or replay at a present position while performing a normal speed play or a high speed browsing of the video contents; and
  b) selecting an actual pause or replay position on the basis of a play direction and play speed of media, an average user response time, a current play position at a time point that said user request is received, and structural/semantic index information of said video contents in response to said user request.

2. The method as set forth in claim 1, wherein said step b) includes the steps of:
  b-1) obtaining a candidate position in consideration of said average user response time based on said media play direction and play speed; and
  b-2) selecting any one of structural/semantic index information change positions within a certain range from said candidate position as said actual replay or pause position on the basis of said current play position at the time point that said user request is received, said candidate position, said play speed, said play direction, a minimum user response time and said semantic/structural index information of said video contents.

3. The method as set forth in claim 2, wherein said step b-1) includes the step of adding or subtracting an offset considering said average user response time to or from said current play position at the time point that said user request is received, based on said play direction, and then setting the resultant position as said candidate position.

4. The method as set forth in claim 2, wherein said step b-1) includes the step of calculating said average user response time based on said play speed by applying a function of said media play speed or a scene change speed of said video contents.

5. The method as set forth in claim 2, wherein said structural information of said video contents includes scene information as a logical story unit and shot information as a physical edit unit as well as time description information.

6. The method as set forth in claim 2, wherein said semantic information of said video contents includes information regarding appearance/disappearance of an object, information regarding occurrence/end of an event, information regarding an object state and information regarding background, which are described based on a time axis.

7. The method as set forth in claim 2, wherein said average user response time is preset.

8. The method as set forth in claim 2, wherein said average user response time is user-dependent data predetermined for each user.

9. The method as set forth in claim 2, wherein said average user response time is edited and designated by said user.

10. The method as set forth in claim 2, wherein, among the positions that said structural/semantic information are changed, positions existing within said minimum user response time are excluded from said step b-2) of selecting said actual pause or replay position.

11. The method as set forth in claim 2, wherein of the positions that said structural/semantic information are changed, a position which is closest to a candidate position selected in consideration of a time offset according to said media play direction and play speed, on the basis of said time offset from said candidate position, has a higher probability to be selected as said actual replay or pause position.

12. The method as set forth in claim 2, wherein, among structural/semantic information change positions existing within a certain browsing range from a candidate position selected in consideration of a time offset based on said media play direction and play speed, a position with a larger unit-scene change has a higher probability to be selected as said actual replay or pause position.

13. The method as set forth in claim 2, wherein said step b-2) includes the step of selecting said actual replay or pause position from structural/semantic information change positions existing within a certain browsing range from a candidate position selected in consideration of a time offset according to said media play direction and play speed, on the basis of a weighted function of said time offset from said candidate position and a scene change level in consideration of the time offset and what size of unit the structural/semantic information are changed.

14. An apparatus for controlling reproduction of video contents, comprising:
  display means for outputting a video stream;
  user interface means for receiving a user's input;
  media storage means for storing video data;
  index storage means for storing structural/semantic index information of the video contents;
  basic setting and user information storage means for storing media play control information and user information; and
  media play control means for receiving said user's request to perform a pause mode or replay mode at a desired position while displaying said video data stored in said media storage means through said display means in a normal play mode or an accelerated play mode, selecting an actual replay or pause position on the basis of a media play direction, a media play speed, a user response time and structural/semantic information change positions, and pausing said video contents at the selected position or replaying them from the selected position at a normal speed.

15. The apparatus as set forth in claim 14, wherein said control means is adapted to select said actual pause or replay position on the basis of a current play position at a point of time that said user's request is received, said media play direction, said media play speed, an average user response time based on said media play speed, and said structural/semantic index information of said video contents in response to said user's request.

16. The apparatus as set forth in claim 14, wherein said user response time includes an average user response time and a minimum user response time, said average user response time and minimum user response time being stored in said basic setting and user information storage means to be used for selection of said actual replay position or pause position by said control means.

17. The apparatus as set forth in claim 14, wherein said basic setting and user information storage means is a nonvolatile memory of a system or a portable nonvolatile storage unit independent of the system.

18. An intelligent video browsing method using structural/semantic information of video contents, comprising steps of receiving a user request for pause or replay at a present position while performing a normal speed play or high speed browsing of the video contents, and selecting an actual pause or replay position in response to the user request, wherein the method further comprising the steps of:
  a) obtaining a primary candidate position on the basis of an average user response time based on a media play direction and a media play speed;
  b) selecting structural/semantic index information change positions existing within a certain browsing range from said primary candidate position as secondary candidate positions; and
  c) extracting a structural/semantic index information change position which is closest to said user request among said secondary candidate positions and setting the extracted structural/semantic index information change position as said actual pause position or normal replay position.

19. The intelligent video browsing method as set forth in claim 18, wherein said step c) includes the step of extracting a structural/semantic information change position closest to said primary candidate position on the basis of a time offset from said primary candidate position among said structural/semantic information change positions existing within said certain browsing range from said primary candidate position and setting the extracted structural/semantic information change position as said actual pause position or replay position.

20. The intelligent video browsing method as set forth in claim 18, wherein said step c) includes the step of selecting said actual pause position or replay position among said structural/semantic information change positions existing within said certain browsing range from said primary candidate position on the basis of a weighted function of a time offset and a scene change level, by applying a higher weight to a closer one of said secondary candidate positions to said primary candidate position and applying a higher weight to a larger unit-scene change than a smaller unit-scene change, said larger unit-scene change being a background change, said smaller unit-scene change being appearance/disappearance of an object.

* * * * *